United States Patent
Ardisana, II et al.

(10) Patent No.: US 11,322,959 B1
(45) Date of Patent: May 3, 2022

(54) EYEWEAR DEVICE CHARGING CASE

(71) Applicants: John Bernard Ardisana, II, Torrance, CA (US); Emily Lauren Clopp, Santa Monica, CA (US); Teodor Dabov, Los Angeles, CA (US); Mathias Hintermann, Playa Vista, CA (US); Jinwoo Kim, Culver City, CA (US); Jun Lin, Sherman Oaks, CA (US); Ashutosh Y. Shukla, Playa Vista, CA (US)

(72) Inventors: John Bernard Ardisana, II, Torrance, CA (US); Emily Lauren Clopp, Santa Monica, CA (US); Teodor Dabov, Los Angeles, CA (US); Mathias Hintermann, Playa Vista, CA (US); Jinwoo Kim, Culver City, CA (US); Jun Lin, Sherman Oaks, CA (US); Ashutosh Y. Shukla, Playa Vista, CA (US)

(73) Assignee: Snap Inc., Santa Monica, CA (US)

(*) Notice: Subject to any disclaimer, the term of this patent is extended or adjusted under 35 U.S.C. 154(b) by 297 days.

(21) Appl. No.: 16/448,051

(22) Filed: Jun. 21, 2019

Related U.S. Application Data

(60) Provisional application No. 62/691,801, filed on Jun. 29, 2018.

(51) Int. Cl.
*H02J 7/00* (2006.01)
*G06F 1/16* (2006.01)
*H01R 13/62* (2006.01)
*H01R 33/94* (2006.01)
*A45C 11/04* (2006.01)
(Continued)

(52) U.S. Cl.
CPC .......... *H02J 7/0047* (2013.01); *A45C 11/04* (2013.01); *A45C 15/00* (2013.01); *G06F 1/1632* (2013.01); *H01R 13/6205* (2013.01); *H01R 33/05* (2013.01); *H01R 33/94* (2013.01); *H02J 7/0045* (2013.01); *G06F 1/163* (2013.01)

(58) Field of Classification Search
USPC .......... 320/106, 107, 108, 109, 110; 351/44, 351/158
See application file for complete search history.

(56) References Cited

U.S. PATENT DOCUMENTS

| | | | | |
|---|---|---|---|---|
| 5,455,637 | A * | 10/1995 | Kallman | ................ G02C 7/101 351/158 |
| 2012/0069503 | A1* | 3/2012 | Lauder | .................... G06T 1/00 361/679.01 |

(Continued)

*Primary Examiner* — Brian Ngo
(74) *Attorney, Agent, or Firm* — Culhane Meadows PLLC; Stephen J. Weed

(57) ABSTRACT

A case for an electronics-enabled eyewear device includes a body defining an opening leading to a storage chamber that is sized for retaining the eyewear device. A cover depends from the body and is movable between an open position, in which the opening is exposed, and a closed position, in which the opening is covered by the cover. A battery is mounted to the body for charging the electronics-enabled eyewear device. A detector is positioned on either the body or the cover for detecting when the cover is in the open position or the closed position. A display displays a charge state of the battery when the cover is in the open position.

15 Claims, 4 Drawing Sheets

(51) Int. Cl.
*A45C 15/00* (2006.01)
*H01R 33/05* (2006.01)

(56) References Cited

U.S. PATENT DOCUMENTS

| | | | |
|---|---|---|---|
| 2014/0204331 A1* | 7/2014 | Huh | G02C 7/101 |
| | | | 351/44 |
| 2019/0272800 A1* | 9/2019 | Tao | G09G 5/006 |
| 2020/0073148 A1* | 3/2020 | Alhaideri | G02F 1/163 |

* cited by examiner

EYEWEAR DEVICE CHARGING CASE

CROSS-REFERENCE TO RELATED APPLICATIONS

This application claims priority to U.S. Provisional application Ser. No. 62/691,801 entitled EYEWEAR DEVICE CHARGING CASE, filed on Jun. 29, 2018, the contents of which are incorporated fully herein by reference.

TECHNICAL FIELD

The subject matter disclosed herein relates generally to a charging case for electronics enabled eyewear.

BACKGROUND

Electronics-enabled eyewear devices, such as smart glasses, typically have integrated electronics requiring an onboard power supply in the form of a battery. Disclosed herein is an eyewear case that is multifunctional in that it stows the glasses and, also, serves as a docking station for charging of the smart glasses' battery. While charging cases for electronics enabled eyewear are known, developments to such cases are continuously sought in the interests of enhancing usability, wireless communications, user convenience, structural integrity, battery life, and charging performance, for example.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
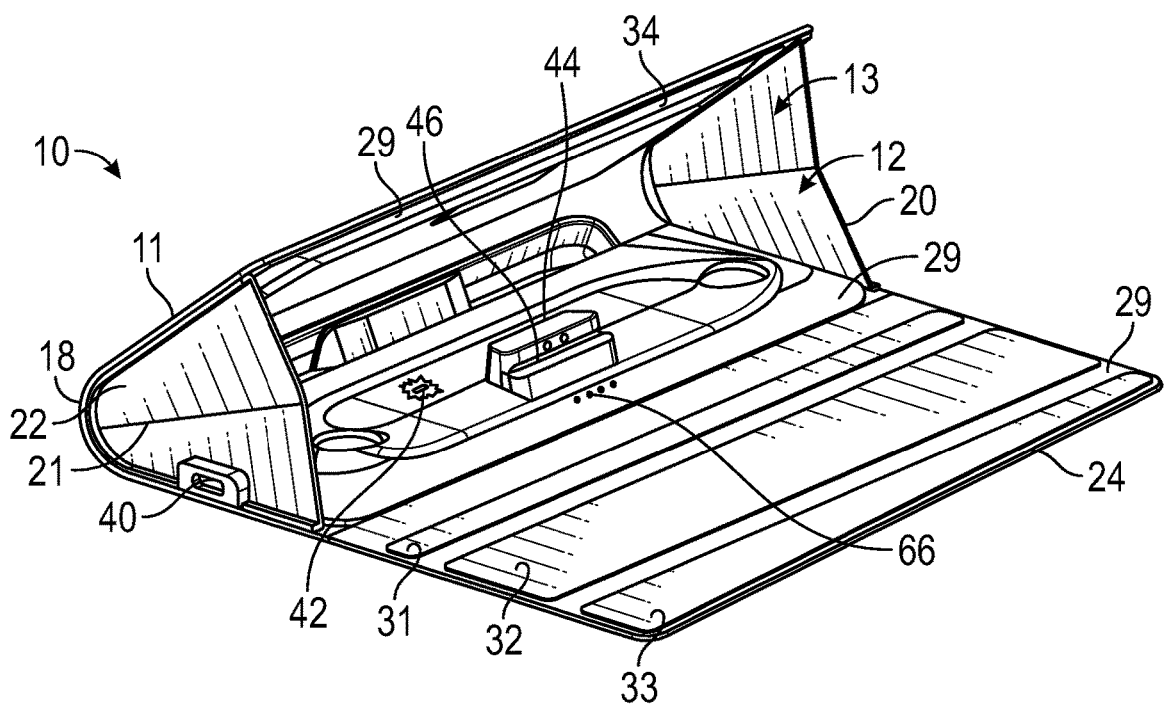
FIG. 1 depicts an isometric view of a charging case according to the present invention shown both open and expanded, wherein portions of the charging case are shown cutaway to reveal internal details.

In the following detailed description, numerous specific details are set forth by way of examples in order to provide a thorough understanding of the relevant teachings. However, it should be apparent to those skilled in the art that the present teachings may be practiced without such details.

This description of the exemplary embodiments that follows is intended to be read in connection with the accompanying drawings, which are to be considered part of the entire written description. In the description, relative terms such as "right," "left," "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

As used herein, a magnet is a material or object that produces a magnetic field. A magnet may be either a permanent magnet or a ferromagnetic material. A permanent magnet is an object made from a material that is magnetized and creates its own persistent magnetic field. Materials that can be magnetized, which are also the ones that are strongly attracted to a magnet, are referred to herein as ferromagnetic.

FIGS. 1-6 show a charging case 10 for electronics enabled eyewear (otherwise referred to herein as eyewear or glasses) according to one embodiment. The case 10 comprises a body 11 having an opening 12 leading to a hollow cavity 13 that is sized and shaped to receive and hold glasses when the temples of the glasses are in a folded state. The body 11 includes a rectangular shaped front wall 14; a rectangular shaped rear wall 16; a curved bottom wall 18 connecting the front and rear walls; a triangular shaped left wall 20 interconnecting the left-side edges of the walls 14, 16 and 18; a triangular shaped right wall 22 interconnecting the right-side edges of the walls 14, 16 and 18; and a trapezoidal shaped flap 24 (also referred to herein as a cover) that extends from the top edge of the rear wall 16 for covering the opening 12 of the body 11 in a closed state of the case 10.

Figure 2:
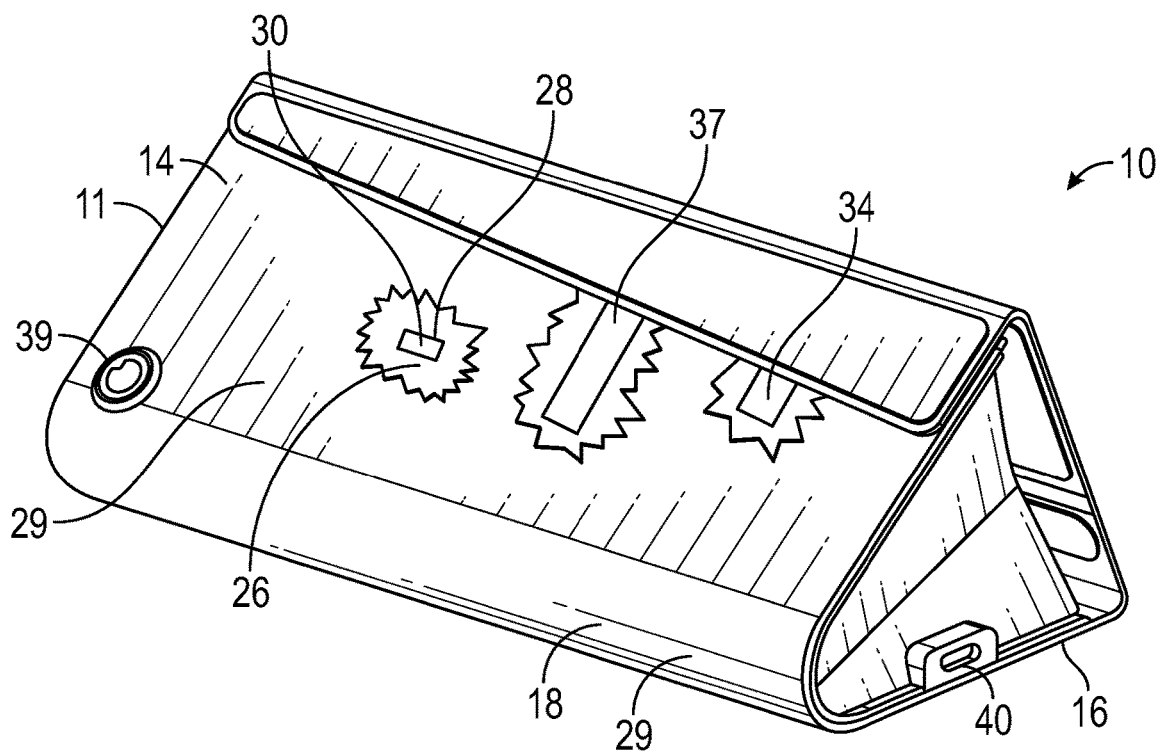
FIG. 2 depicts an isometric view of the charging case shown closed and expanded, wherein portions of the charging case are shown cutaway to reveal internal details.
Figure 3:
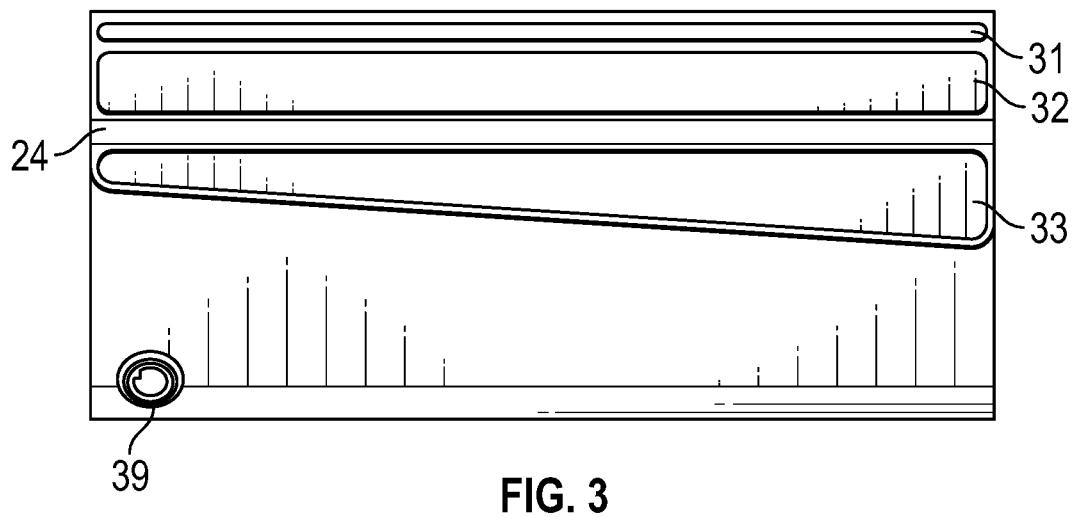
FIG. 3 is a front elevation view of the charging case shown closed and expanded.
Figure 4:
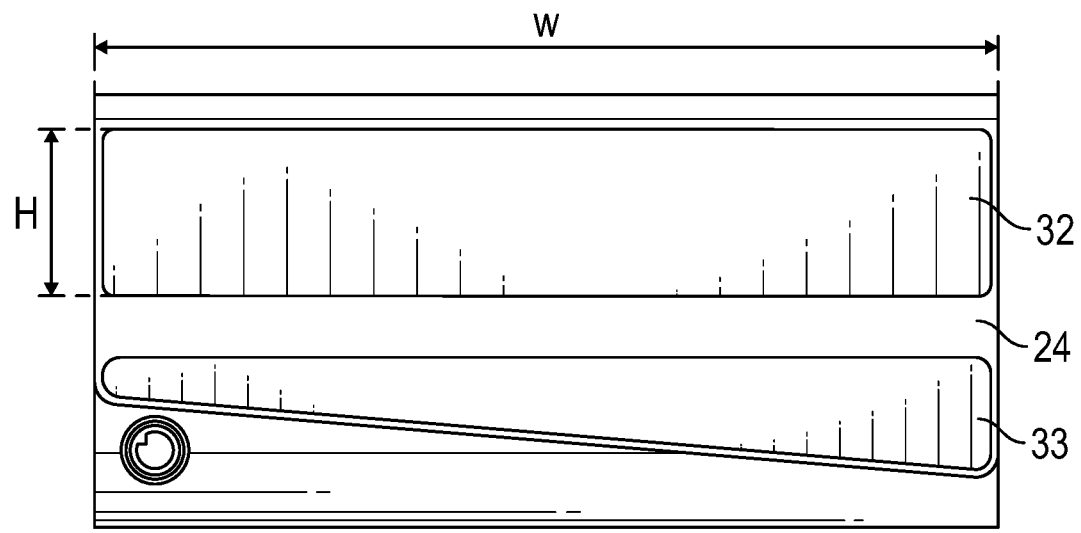
FIG. 4 is a front elevation view of the charging case shown closed and collapsed.

The front wall 14 and the rear wall 16 each includes a plurality of layers. As best shown in FIG. 2, each of the walls 14 and 16 includes a base layer 26 that is composed of a solid material, such as aluminum. Both sides of the base layer 26 (i.e., outward facing and inward facing) are covered by a decorative material layer 29 that is visible to the end user. The decorative material layer 29 may be microfiber or leather, for example. One or more plastic layers (not shown) may be positioned on each side of the base layer 26, and which are also covered by the decorative material layer 29.

A series of protrusions and recesses are formed on the interior facing surface of the front and rear walls 14 and 16 that are sized and shaped to contact surfaces of the glasses (not shown) to limit movement of the glasses when they are stowed within the case 10.

One or more windows or openings 28 are defined in the base layer 26 of each wall 14 and 16, and a plastic insert 30 is positioned within each opening 28. Because the walls 14 and 16 are (optionally) composed of aluminum, which either limits or prevents the passage of wireless signals therethrough, the openings 28 in the aluminum material are provided to permit the entry and exit of those wireless signals into the cavity 13 in which the glasses are positioned. In operation, wireless signals propagate between the glasses within the case 10 and either a phone or Wi-Fi connection external to the case 10.

A Hall-effect sensor 34 is mounted either in or to the base layer 26 of the front wall 14, and is covered by the decorative material layer 29 so that the sensor 34 is not visible to the end user. A Hall-effect sensor is a transducer that varies its output voltage in response to a magnetic field. The Hall-effect sensor 34 interacts with a magnet in the flap 34 to detect whether the case 10 is either open or closed, as will be described later.

One or more magnets 37 (one shown) are mounted either in or to the base layer 26 of the front wall 14, and are covered by the decorative material layer 29 so that they are not visible to the end user. The one or more magnets 37 interact with magnets that are embedded in the flap 24 for releasably retaining the flap 24 to the front wall 14 in either the closed and collapsed state (FIG. 6) or the closed and expanded state (FIG. 5) of the case 10.

A decorative badge 39 (FIG. 3) is disposed on the outwardly facing side of the front wall 14. The decorative badge 39 may (optionally) incorporate an LED light, for example, that illuminates at pre-defined times, such as when the case 10 is connected to a power source, the glasses are stored in the case 10, the glasses and/or the case require charging, the case receives data, the case transmits data, and so forth.

The curved bottom wall 18 that connects the front and rear walls 14 and 16 includes a plurality of layers including an elastically deformable inner plastic layer that is covered on each side by the same decorative layer 29 as the other walls. The curved bottom wall 18 may be referred to herein as a mechanical spring. The natural state of the bottom wall 18 is the collapsed state shown in FIG. 6. Moving the case 10 from the collapsed state (FIG. 6) to the expanded state (FIG. 5), in order to stow the glasses within the cavity 13 of the case 10, causes the bottom wall 18 to elastically deform in an outward direction. When either the glasses are removed from the cavity 13 of the case 10 or a force that is manually applied to the case 10 for maintaining the case in the expanded state is removed, the curved bottom wall 18 returns the case 10 to its natural collapsed state shown in FIG. 5.

The left and right triangular shaped walls 20 and 22 are (optionally) composed of the same decorative layer 29 as the other walls, and may or may not include an interior layer composed of aluminum or plastic, for example. The left and right walls 20 and 22, respectively, each have a preformed fold 21 that is capable of being folded inwardly when the case 10 is moved from the expanded state of FIG. 5 to the collapsed state of FIG. 6.

Figure 5:
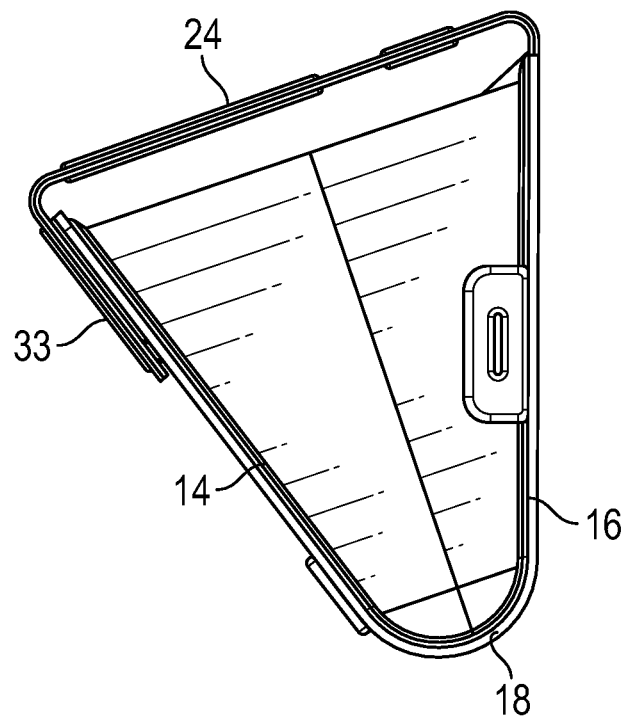
FIG. 5 is a right side elevation view of the charging case shown closed and expanded.
Figure 6:
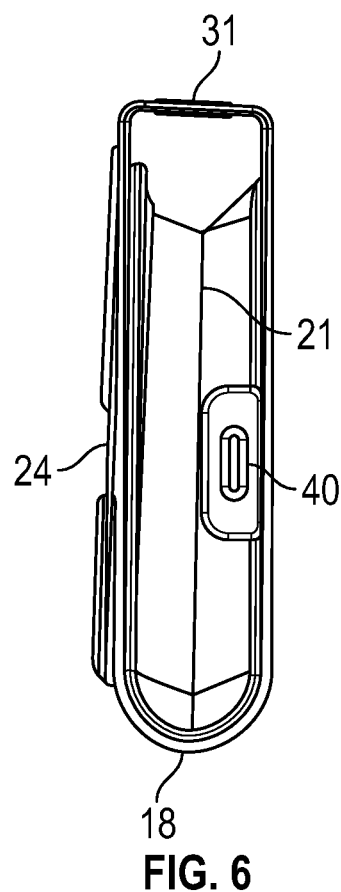
FIG. 6 is a right side elevation view of the charging case shown closed and collapsed.

The trapezoidal shaped flap 24 includes articulated and interconnected segments, as best appreciated by comparing FIGS. 5 and 6. The flap 24 includes inner facing and outer facing layers. The inner facing and outer facing layers may be composed of the same decorative layer 29 as the other walls.

A series of inserts are embedded between the inner facing and outer facing layers of the flap 24. A first insert 31, which is positioned closest to the rear wall 16, has a rectangular shape with rounded edges and is composed of plastic. A second insert 32, which is positioned further from the rear wall 16, has a rectangular shape with rounded edges and is composed of a magnet that is sandwiched between two plastic pieces. The width dimension 'w' (FIG. 4) of the second insert 32 is substantially equal to that of the first insert 31, however, the height dimension 'h' of the second insert 32 is substantially greater than that of the first insert 31. A third insert 33, which is positioned furthest from the rear wall 16, has a trapezoidal shape with rounded edges and is also composed of a magnet that is sandwiched between two plastic pieces.

The magnets of the second and third inserts 32 and 33 interact with one or more magnets 37 (one shown) that are embedded in the front wall 14 for releasably retaining the flap 24 to the front wall 14 in either the closed and collapsed state (FIG. 6) or the closed and expanded state (FIG. 5) of the case 10. The magnet of the inserts 32 and 33 could be a permanent magnet while the magnet 37 could be ferromagnetic, or vice versa. Additionally, the magnets of the second and third inserts 32 and 33 interact with the Hall-effect sensor 34, as will be described later.

The outline of each insert 31 through 33 is visible to the end user from both sides of the flap 24, as shown in the figures, for ornamental purposes. The inserts 31-33 are connected together by the inner facing and outer facing layers, which are soft and flexible, such that the inserts 31-33 can articulate and be positioned at 120 degree angles (or greater) with respect to one another, as best shown in FIGS. 5 and 6.

A connector 40 that is capable of transferring power (and/or signal) is mounted to the right edge of the rear wall 16. In operation, a cable 73 (FIG. 8) is connected to the connector 40 for charging a battery 42 within the case. The battery 42 is interconnected to the connector 40 by circuitry stored within the case 10, as will be described in greater detail with respect to FIG. 8. The connector 40 may be a USB connector, for example, or a connector having radial charge contacts. One of ordinary skill in the art will recognize that the connector 40 may be any style electrical connector that is capable of transferring power, and is not limited to a particular style of connector.

Figure 7:
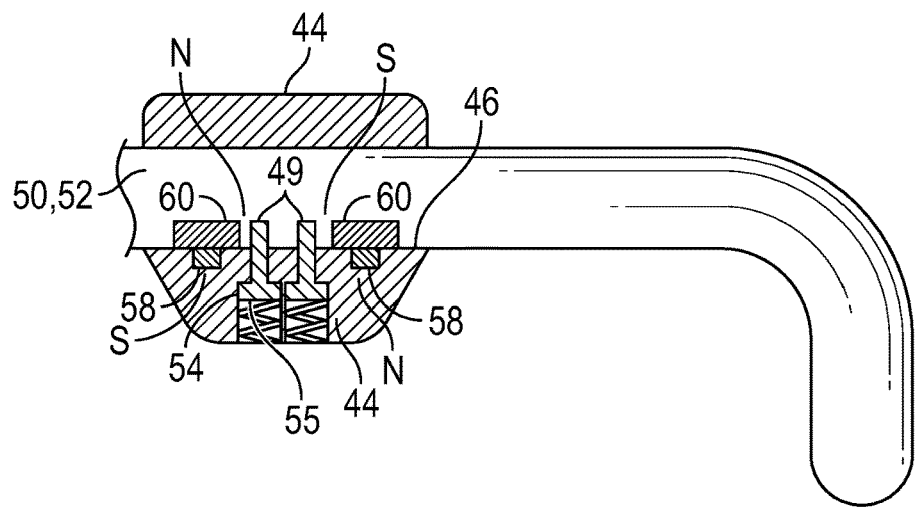
FIG. 7 depicts a schematic view of charging contacts disposed on glasses that are connected to a connector of the charging case.

As best shown in FIGS. 1 and 7, a charging connector 44 protrudes from the interior facing side of the rear wall 16 into the cavity 13 of the case 10. The charging connector 44 is configured to be releasably connected to charging contacts 49 exposed on the temple 50 of the glasses 52 for charging a battery in the glasses using the battery of the case 10. The charging connector 44 comprises a plastic housing that is fastened to the base layer 26 of the front wall 14 by screws or adhesive, for example. A shoulder 46 is formed on the connector 44, which forms a shelf upon which the temple 50 of the glasses 52 can be positioned. Two electrical contacts 54 are disposed within the charging connector 44 for interacting with the charging contacts 49 of the glasses 52. Each electrical contact 54 is electrically connected to the battery 42 of the case 10 for receiving power therefrom, and transferring that power to the charging contacts 49 of the glasses 52.

According to one embodiment, each electrical contact 54 is a pogo-pin style contact that is biased outwardly by an internal spring 55. In an assembled form of the case 10, the spring 55 biases the contact 54 outwardly toward the charging contacts 49 disposed on the temple 50 of the glasses 52. The outwardly biasing action of the spring 55 helps to ensure sufficient surface contact between the electrical contacts 54 of the case 10 and the charging contacts 49 of the glasses 52 so that electricity can be reliably transferred from the battery 42 of the case 10 to the internal battery (not shown) of the glasses 52. Suitable pogo-pin style contacts are distributed by the Mill-Max Corporation of New York, USA.

Magnets 58 of the case connector 44 are positioned on either side of the electrical contacts 54. The magnets 58 interact with magnets 60 disposed on the temple 50 of the glasses 52. The magnetic force between the magnets 58 and 60 is sufficiently greater than the spring force of the electrical contact 54 to ensure that the temple 50 of the glasses 52 remains connected to the connector 44 of the case 10 while the springs 55 bias the temple 50 of the glasses 52 away from the case 10. One set of the two sets of magnets 58 and 60 could be a permanent magnet, whereas the other set of the two sets of magnets 58 and 60 could be ferromagnetic.

The adjacent magnets 58 have opposite polarity (as indicated by the North (N) and South (S) designations), and the adjacent magnets 60 also have opposite polarity, to provide an even stronger attraction between the mating magnets.

A display or indicator in the form of a plurality of lights 66 (four shown) are disposed on the interior facing side of the rear wall 16. The lights 66 may be LED lights. The lights 66 illuminate to represent the power remaining in the battery 42 of the case 10. For example, if the battery 42 is fully charged then all four lights 66 will be illuminated, whereas, if the battery 42 is significantly depleted then one light 66 will be illuminated. The lights 66 are connected to a circuit that is also connected to the Hall-effect sensor 34. When the Hall-effect sensor 34 does not sense the presence of the magnets on the flap 34 (indicating that the case 10 is open), the sensor 34 transmits a signal to a computer processor 80, and the processor activates one or more of the lights 66 depending upon the charge state of the battery 42. Thus, the lights 66 are only illuminated when the flap 34 is open thereby conserving battery power. It should be understood that the display may vary from that which is shown and described. For example, the display could comprise a single light that is capable of illuminating different colors, e.g., green indicating a full charge and red indicating a low charge or no charge. Various other suitable displays are known to those skilled in the art.

Figure 8:
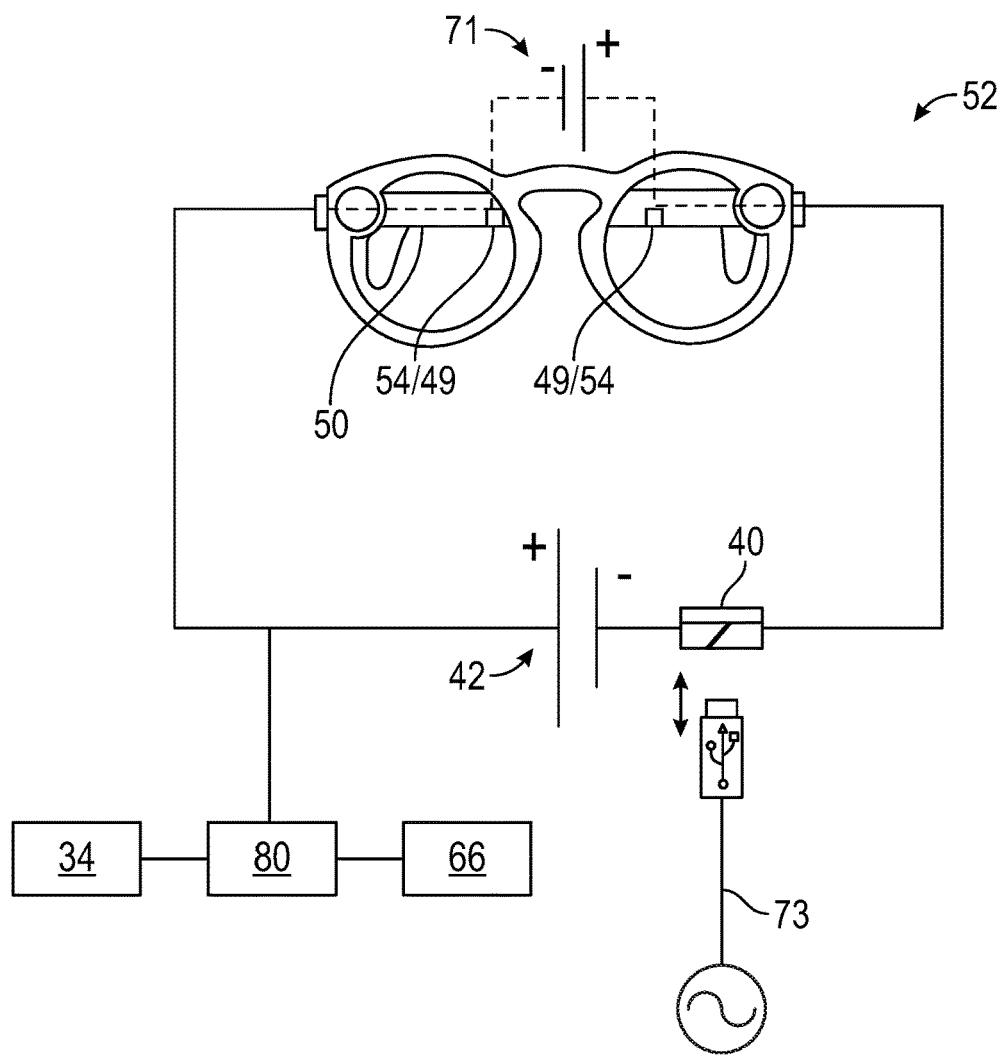
FIG. 8 is a highly simplified schematic circuit diagram showing charging circuitry forming part of the charging case and a complimentary eyewear device to be charged by the charging circuitry of the charging case.

FIG. 8 is a highly simplified schematic circuit diagram showing charging circuitry of a kit including the charging case 10 and the complimentary glasses 52 to be charged by the charging circuitry of the charging case 10. In this example embodiment, the battery 42 of the case 10 is conductively coupled to both of the charging contacts 49 of the glasses 52. The battery 42, charging contact 54, and the conductive paths between them together form an interrupted charging circuit that can be completed by the glasses 52 via contact engagement of the respective charging contacts 49 of the glasses 52 with the corresponding charging contacts 54 of the case 10.

As shown schematically in FIG. 8 in broken lines, the onboard electronics of the glasses 52 includes charging circuitry connecting both of the charging contacts 49 to the onboard battery 71 of the glasses 52. This internal charging circuitry is configured to cause charging of the onboard battery 71 when a voltage difference with the illustrated polarity is applied over the charging contacts 49.

The case battery 42 is connected to the charging connector port 40 incorporated in the case 10. The case 10 thus includes a charging circuit option for the case battery 42, in this example embodiment by connection to the mains power via a charging cable 73 removably connectable to the charging port 40. In some embodiments, the charging circuit of the case 10 is configured such that connection to mains power via the charging port 40 while the glasses 52 are connected to the charging circuit (such as in FIG. 8) resulting in charging of the onboard battery of the glasses 52 by mains power.

When the glasses 52 are located in the case 10 in a charging configuration in which both charging contacts 49 are conductively coupled to the respective charging contacts 54, the onboard battery 71 of the glasses 52 is automatically recharged by the battery 42 of the case 10 (or, if the case 10 is connected to mains power by a charging cable 73, the glasses battery 71 is recharged by mains power).

A processor 80 is connected to the power circuit, in addition to the Hall-effect sensor 34 and the lights 66. The processor 80 receives the charge state of the case battery 42 through the power circuit. When the Hall-effect sensor 34 transmits a signal to the processor 80 indicating that the flap 24 of the case 10 is open, the processor 80 polls the power circuit to determine the charge state of the case battery 42, and illuminates the appropriate amount of lights 66 to indicate the charge state of the battery 42, as described above.

It is to be understood that the steps of the processes described herein are performed by the processor 80 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the processor described herein is implemented in software code or instructions which are tangibly stored on a tangible computer readable medium. Upon loading and executing such software code or instructions by the processor, the processor may perform any of the functionalities described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A case for an electronics-enabled eyewear device, the case comprising:

a body defining an opening leading to a storage chamber that is sized for retaining the eyewear device;

a cover depending from the body that is movable between an open position, in which the opening is exposed, and a closed position, in which the opening is covered by the cover;

a battery mounted to the body for charging the electronics-enabled eyewear device;

a power connector mounted in the storage chamber, the power connector including one or more charging contacts for engagement with one or more complementary contacts on the eyewear device, the charging contacts being conductively connected to the battery to enable charging of the eyewear device via the charging contacts, the power connector further comprising a shoulder for engagement with a complementary surface on the eyewear device;

a detector positioned on either the body or the cover for detecting when the cover is in the open position or the closed position; and a display for displaying a charge state of the battery, wherein the display is configured to display the charge state of the battery when the cover is in the open position.

2. The case of claim 1, wherein the detector is a Hall-Effect sensor, and the detector is positioned on the body.

3. The case of claim 2, further comprising a magnet mounted on the cover, wherein the Hall-Effect sensor detects the presence of the magnet in the closed position of the cover and does not detect the presence of the magnet in the open position of the cover.

4. The case of claim 1, wherein the display is a plurality of lights, and the lights are illuminated based upon the charge state of the battery.

5. The case of claim 1, further comprising a foldable side wall that forms part of the body and that at least partially defines the storage chamber.

6. The case of claim 5, wherein the power connector is at least partially positioned on the foldable side wall.

7. The case of claim 1, further comprising a magnet mounted on the cover and a magnet mounted on the body that is attracted to the magnet mounted on the cover to retain the cover in the closed position.

8. The case of claim 1, wherein each charging contact of the power connector is a spring-loaded contact.

9. The case of claim 8, wherein the power connector further comprises a magnet positioned adjacent each spring-loaded contact for engagement with a complementary magnet on the eyewear device.

10. The case of claim 9, wherein a magnetic force between the magnets of the power connector and the eyewear device is greater than a spring force of each spring-loaded contact to ensure that the one or more charging contacts remain engaged with the one or more complementary contacts on the eyewear device.

11. The case of claim 1, wherein the power connector further comprises two magnets positioned adjacent the one or more charging contacts of the power connector for engagement with complementary magnets on the eyewear device, wherein exposed surfaces of the two magnets of the power connector have opposite polarity.

12. A case for an electronics-enabled eyewear device, the case comprising:

a body defining an opening leading to a storage chamber that is sized for retaining the eyewear device;

a cover depending from the body that is movable between an open position, in which the opening is exposed, and a closed position, in which the opening is covered by the cover;

a battery mounted to the body for charging the electronics-enabled eyewear device;

a detector positioned on either the body or the cover for detecting when the cover is in the open position or the closed position; and a display for displaying a charge state of the battery, wherein the display is configured to display the charge state of the battery when the cover is in the open position, wherein the body comprises a front wall, a rear wall, a bottom wall connecting the front wall to the rear wall, and left and right side walls each connecting the front, rear and bottom walls, wherein the body is configured to move between expanded and collapsed positions, and wherein the bottom wall is a spring member that is configured to return the body from the expanded position to the collapsed position.

13. The case of claim 12, wherein the left and right side walls are flexible and foldable.

14. A case for an electronics-enabled eyewear device, the case comprising:

a body defining an opening leading to a storage chamber that is sized for retaining the eyewear device;

a cover depending from the body that is movable between an open position, in which the opening is exposed, and a closed position, in which the opening is covered by the cover;

a battery mounted to the body for charging the electronics-enabled eyewear device;

a detector positioned on either the body or the cover for detecting when the cover is in the open position or the closed position; and a display for displaying a charge state of the battery, wherein the display is configured to display the charge state of the battery when the cover is in the open position, wherein the body comprises a front wall, a rear wall, a bottom wall connecting the front wall to the rear wall, and left and right side walls each connecting the front, rear and bottom walls, and wherein the front wall and the rear wall comprise a metallic material having openings formed therein to permit the transmission of signals to and from the electronics-enabled eyewear device.

15. The case of claim 14, further comprising plastic material positioned within the openings of the metallic material.

* * * * *